(12) United States Patent
Lee et al.

(10) Patent No.: US 11,947,089 B2
(45) Date of Patent: Apr. 2, 2024

(54) OPTICAL IMAGING SYSTEM

(71) Applicant: Samsung Electro-Mechanics Co., Ltd., Suwon-si (KR)

(72) Inventors: Tae Youn Lee, Suwon-si (KR); Jae Hyun Baik, Suwon-si (KR); Yong Joo Jo, Suwon-si (KR); Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/178,739

(22) Filed: Mar. 6, 2023

(65) Prior Publication Data

US 2023/0204930 A1    Jun. 29, 2023

Related U.S. Application Data

(63) Continuation of application No. 17/118,990, filed on Dec. 11, 2020, now Pat. No. 11,635,593, which is a
(Continued)

(30) Foreign Application Priority Data

Sep. 26, 2017  (KR) .................. 10-2017-0124108

(51) Int. Cl.
*G02B 13/00*   (2006.01)
*G02B 9/62*    (2006.01)

(52) U.S. Cl.
CPC ............ *G02B 13/0045* (2013.01); *G02B 9/62* (2013.01)

(58) Field of Classification Search
CPC ............................. G02B 13/0045; G02B 9/62
(Continued)

(56) References Cited

U.S. PATENT DOCUMENTS 8,780,464 B2   7/2014  Huang
9,952,409 B2   4/2018  Lee
(Continued)

FOREIGN PATENT DOCUMENTS

CN   102985865 A   3/2013
CN   103913824 A   7/2014
(Continued)

OTHER PUBLICATIONS

Gross, Herbert, et al., *Handbook of Optical Systems*, vol. 3: *Aberration Theory and Correction of Optical Systems*, Section 33.1.3, "Methods of Improving a Design," and Section 33.1.4, "Zero Power Operations," pp. 377-379, 2007, Wiley-VCH Verlag GmbH & Co. KGaA, Weinheim, Germany.
(Continued)

*Primary Examiner* — William Choi
(74) *Attorney, Agent, or Firm* — NSIP Law

(57) ABSTRACT

An optical imaging system includes a first lens having an image-side surface that is concave; a second lens having a refractive power; a third lens having an object-side surface that is convex; a fourth lens having an image-side surface that is concave; a fifth lens having a refractive power; and a sixth lens having a refractive power and an image-side surface having an inflection point, wherein the first lens through the sixth lens are sequentially disposed in numerical order from an object side of the optical imaging system toward an imaging plane of the optical imaging system, and the optical imaging system satisfies $TL/(2Y) \leq 1.01$ and $1.2 \leq \tan\theta$, where TL is a distance from an object-side surface of the first lens to the imaging plane, 2Y is a diagonal length of the imaging plane, and $\theta$ is half a field of view of the optical imaging system.

15 Claims, 11 Drawing Sheets

Related U.S. Application Data continuation of application No. 16/103,086, filed on Aug. 14, 2018, now Pat. No. 10,890,737.

(58) Field of Classification Search
USPC ............................... 359/713, 752, 756, 761
See application file for complete search history.

(56) References Cited

U.S. PATENT DOCUMENTS

| | | | |
|---|---|---|---|
| 9,964,739 | B1 | 5/2018 | Shi |
| 10,215,959 | B2 | 2/2019 | You |
| 10,247,923 | B1 * | 4/2019 | Oinuma ............... G02B 1/041 |
| 10,976,521 | B2 | 4/2021 | Baik |
| 2013/0120858 | A1 | 5/2013 | Sano |
| 2014/0185141 | A1 | 7/2014 | Lee et al. |
| 2014/0368931 | A1 | 12/2014 | Noda et al. |
| 2015/0098135 | A1 | 4/2015 | Chung et al. |
| 2015/0109692 | A1 | 4/2015 | Son |
| 2016/0147044 | A1 | 5/2016 | Kondo |
| 2016/0161709 | A1 | 6/2016 | Hsueh et al. |
| 2016/0178871 | A1 | 6/2016 | You |
| 2017/0082834 | A1 | 3/2017 | Tang et al. |
| 2017/0108666 | A1 | 4/2017 | Lee |
| 2017/0153421 | A1 | 6/2017 | Baik |
| 2017/0269342 | A1 | 9/2017 | Jung et al. |
| 2017/0276909 | A1 | 9/2017 | Jung et al. |
| 2018/0011297 | A1 | 1/2018 | Lai et al. |
| 2018/0314039 | A1 | 11/2018 | Dai |
| 2019/0212532 | A1 | 7/2019 | Yuza et al. |

FOREIGN PATENT DOCUMENTS

| | | |
|---|---|---|
| CN | 104570294 A | 4/2015 |
| CN | 105717611 A | 6/2016 |
| CN | 106597636 A | 4/2017 |
| CN | 106646835 A | 5/2017 |
| CN | 106802478 A | 6/2017 |
| CN | 106842511 A | 6/2017 |
| CN | 107065125 A | 8/2017 |
| JP | 2014-240918 A | 12/2014 |
| KR | 10-1429890 B1 | 8/2014 |
| KR | 10-2015-0020233 A | 2/2015 |
| KR | 10-2016-0075015 A | 6/2016 |
| KR | 10-1690482 B1 | 12/2016 |
| KR | 10-2017-0054335 A | 5/2017 |
| KR | 10-2017-0109858 A | 10/2017 |
| WO | WO 2014/175058 A1 | 10/2014 |

OTHER PUBLICATIONS

Korean Office Action dated Sep. 6, 2018, in counterpart Korean Patent Application No. 10-2017-0124108 (8 pages in English, 6 pages in Korean).

Korean Office Action dated Feb. 25, 2019, in counterpart Korean Patent Application No. 10-2017-0124108 (6 pages in English, 5 pages in Korean).

Chinese Office Action dated Aug. 31, 2020, in counterpart Chinese Patent Application No. 201811107407.9 (6 pages in English, 7 pages in Chinese).

Chinese Office Action dated Apr. 6, 2021, in counterpart Chinese Patent Application No. 201811107407.9 (7 pages in English and 8 pages in Chinese).

Korean Office Action dated Jul. 7, 2021, in counterpart Korean Patent Application No. 10-2021-0065869 (8 pages in English and 5 pages in Korean).

Chinese Office Action dated Aug. 31, 2022, in counterpart Chinese Patent Application No. 202111196312.0 (8 Pages in English, 9 Pages in Chinese).

Korean Office Action dated Jul. 6, 2022, in counterpart Korean Patent Application No. 10- 2022-0042251 (10 pages in English and 7 pages in Korean).

Gross, Herbert, et al. "Handbook of Optical Systems: Aberration Theory and Correction of Optical Systems." Wiley-VCH. vol. 3. (2007).

* cited by examiner

OPTICAL IMAGING SYSTEM

CROSS-REFERENCE TO RELATED APPLICATIONS

This application is a continuation of application Ser. No. 17/118,990 filed on Dec. 11, 2020, now U.S. Pat. No. 11,635,593, which is a continuation of application Ser. No. 16/103,086 filed on Aug. 14, 2018, now U.S. Pat. No. 10,890,737, which in turn claims the benefit under 35 USC 119(a) of Korean Patent Application No. 10-2017-0124108 filed on Sep. 26, 2017, in the Korean Intellectual Property Office, the entire disclosures of which are incorporated herein by reference for all purposes.

BACKGROUND

1. Field

This application relates to an optical imaging system having a wide field of view.

2. Description of Related Art

Small camera modules are mounted in many wireless terminals. For example, one small camera module may be mounted facing a front surface of a wireless terminal, and another small camera module may be mounted facing a rear surface of the wireless terminal. Since the small camera module is used for a variety of applications such as capturing an outdoor image of a landscape and capturing an indoor image of a person, it is desirable that the performance of the small camera module be similar to the performance of a regular camera. However, increasing the performance of the small camera module tends to increase an overall length of the small camera module, causing the small camera module to protrude from a surface of the wireless terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having an image-side surface that is concave; a second lens having a refractive power; a third lens having an object-side surface that is convex; a fourth lens having an image-side surface that is concave; a fifth lens having a refractive power; and a sixth lens having a refractive power and an image-side surface having an inflection point; wherein the first lens through the sixth lens are sequentially disposed in numerical order from an object side of the optical imaging system toward an imaging plane of the optical imaging system, and the optical imaging system satisfies the conditional expressions $TL/(2Y) \leq 1.01$ and $1.2 \leq \tan \theta$, where TL is a distance from an object-side surface of the first lens to the imaging plane, 2Y is a diagonal length of the imaging plane, and $\theta$ is half of a field of view of the optical imaging system.

An object-side surface of the second lens may be convex.
An object-side surface of the fourth lens may be convex.
An object-side surface of the fifth lens may be concave.
An image-side surface of the fifth lens may be convex.
An object-side surface of the sixth lens may be convex.

The image-side surface of the sixth lens may be concave.

The optical imaging system may further satisfy the conditional expression $-35 < \{(1/f)*(Y/\tan \theta)-1\}100 < -5.0$, where f is an overall focal length of the optical imaging system, and Y is half of the diagonal length of the imaging plane.

The optical imaging system may further satisfy the conditional expression $0.3 < (R1+R2)/(R1-R2) < 3.0$, where R1 is a radius of curvature of an object-side surface of the first lens, and R2 is a radius of curvature of the image-side surface of the first lens.

The optical imaging system may further satisfy the conditional expression $0.1 < |f/f3| < 2.0$, where f is an overall focal length of the optical imaging system, and f3 is a focal length of the third lens.

The optical imaging system may further satisfy the conditional expression $1.8 < f/EPD < 2.4$, where f is an overall focal length of the optical imaging system, and EPD is an entrance pupil diameter of the optical imaging system.

The optical imaging system may further satisfy the conditional expression $0.4 < (t1+t2)/t3 < 2.0$, where t1 is a thickness of the first lens measured along an optical axis of the first lens, t2 is a thickness of the second lens measured along an optical axis of the second lens, and t3 is a thickness of the third lens measured along an optical axis of the third lens.

The optical imaging system may further satisfy the conditional expression $30 < V5-V6 < 40$, where V5 is an Abbe number of the fifth lens, and V6 is an Abbe number of the sixth lens.

The optical imaging system may further include a stop disposed between the second lens and the third lens.

In another general aspect, an optical imaging system includes a first lens having a refractive power; a second lens having a refractive power; a third lens having a refractive power; a fourth lens having an image-side surface that is concave; a fifth lens having an image-side surface that is convex; and a sixth lens having a refractive power and an image-side surface having an inflection point, wherein the first lens through the sixth lens are sequentially disposed in numerical order from an object side of the optical imaging system toward an imaging plane of the optical imaging system, and the optical imaging system satisfies the conditional expressions $TL/(2Y) \leq 1.01$ and $0.3 < (R1+R2)/(R1-R2) < 3.0$, where TL is a distance from an object-side surface of the first lens to the imaging plane, 2Y is a diagonal length of the imaging plane, R1 is a radius of curvature of an object-side surface of the first lens, and R2 is a radius of curvature of an image-side surface of the first lens.

The image-side surface of the first lens may be concave.
An object-side surface of the second lens may be convex.

In another general aspect, an optical imaging system includes a first lens having a refractive power; a second lens having a refractive power; a third lens having a refractive power; a fourth lens having a refractive power; a fifth lens having a refractive power; and a sixth lens having a refractive power and a surface having an inflection point; wherein the first lens through the sixth lens are sequentially disposed in numerical order from an object side of the optical imaging system toward an imaging plane of the optical imaging system, the refractive power of the first lens and the refractive power of the sixth lens have a same sign, the refractive power of the second lens and the refractive power of the fifth lens have a same sign, the refractive power of the third lens and the refractive power of the fourth lens have different signs, and the optical imaging system satisfies any one or any combination of any two or more of the conditional expressions $TL/(2Y) \leq 1.01$, $1.2 \leq \tan \theta$, and $0.3 < (R1+R2)/$ (R1−R2)<3.0, where TL is a distance from an object-side surface of the first lens to the imaging plane, 2Y is a diagonal length of the imaging plane, θ is half of a field of view of the optical imaging system, R1 is a radius of curvature of an object-side surface of the first lens, and R2 is a radius of curvature of an image-side surface of the first lens.

The first lens and the sixth lens each may have a negative refractive power, the second lens and the fifth lens each may have a positive refractive power, and the third lens may have a positive refractive power and the fourth lens may have a negative refractive power, or the third lens may have a negative refractive power and the fourth lens may have a positive refractive power.

The image-side surface of the first lens may be concave, an object-side surface of the third lens may be convex, an image-side surface of the fourth lens may be concave, and an image-side surface of the fifth lens may be convex.

The first lens, the third lens, and the fifth lens each may have a refractive index less than 1.6 and the second lens, the fourth lens, and the sixth lens each may have a refractive index greater than 1.62 and less than 2.0, or the second lens and the fifth lens each may have a refractive index less than 1.6 and the first lens, the third lens, the fourth lens, and the sixth lens each may have a refractive index greater than 1.65 and less than 2.0.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
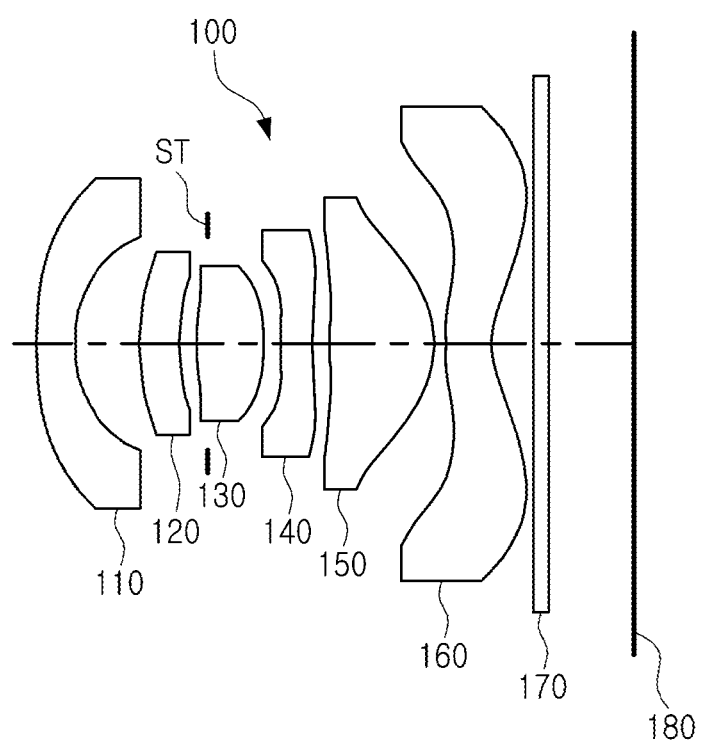
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In this application, a first lens is a lens closest to an object (or a subject), while a sixth lens is a lens closest to an imaging plane (or an image sensor). Further, radii of curvature, thicknesses of lenses, a total length (TL) of the optical imaging system (a distance from an object-side surface of a first lens to the imaging plane), an image height Y (half of a diagonal length of the imaging plane), and focal lengths are expressed in millimeters (mm).

Further, thicknesses of the lenses, gaps between the lenses, and the TL are distances measured along optical axes of the lenses. Further, in a description of the shapes of the lenses, a statement that one surface of a lens is convex means that at least a paraxial region of the surface is convex, and a statement that one surface of a lens is concave means that at least a paraxial region of the surface is concave. A paraxial region of a lens surface is a central portion of the lens surface surrounding the optical axis of the lens in which light rays incident to the lens surface make a small angle $\theta$ to the optical axis and the approximations $\sin \theta \approx \theta$, $\tan \theta \approx \theta$, and $\cos \theta \approx 1$ are valid. Therefore, although it may be stated that one surface of a lens is convex, an edge portion of the surface may be concave. Likewise, although it may be stated that one surface of a lens is concave, an edge portion of the surface may be convex.

The examples of an optical imaging system described in this application include six lenses. For example, the optical imaging system includes a first lens, a second lens, a third lens, a fourth lens, a fifth lens, and a sixth lens sequentially disposed in numerical order from an object side of the optical imaging system toward an imaging plane side of the optical imaging system. The first lens through the sixth lens may be disposed so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens. Thus, an image-side surface of one lens may not be in contact with an object-side surface of a next lens closer to the imaging plane.

The first lens may have a refractive power. For example, the first lens may have a negative refractive power. One surface of the first lens may be concave. For example, an image-side surface of the first lens may be concave.

The first lens may have an aspherical surface. For example, both surfaces of the first lens may be aspherical. The first lens may be made of a material having a high light transmissivity and an excellent workability. For example, the first lens may be made of plastic.

The second lens may have a refractive power. For example, the second lens may have a positive refractive power. One surface of the second lens may be convex. For example, an object-side surface of the second lens may be convex.

The second lens may have an aspherical surface. For example, an object-side surface of the second lens may be aspherical. The second lens may be made of a material having a high light transmissivity and an excellent workability. For example, the second lens may be made of plastic. The second lens may have a refractive index different from the refractive index of the first lens. In one example, the refractive index of the first lens may be less than 1.6, and the refractive index of the second lens may be 1.65 or more. In another example, the refractive index of the first lens may be 1.6 or more, and the refractive index of the second lens may be less than 1.6.

The third lens may have a refractive power. For example, the third lens may have a positive refractive power or a negative refractive power. One surface of the third lens may be convex. For example, an object-side surface of the third lens may be convex.

The third lens may have an aspherical surface. For example, an image-side surface of the third lens may be aspherical. The third lens may be made of a material having a high light transmissivity and an excellent workability. For example, the third lens may be made of plastic. The third lens may have a refractive index that is substantially equal to the refractive index of the first lens. In one example, the refractive index of the first lens may be less than 1.6, and the refractive index of the third lens also may be less than 1.6. In another example, the refractive index of the first lens may be 1.6 or more, and the refractive index of the third lens also may be 1.6 or more.

The fourth lens may have a refractive power. For example, the fourth lens may have a positive refractive power or a negative refractive power. One surface of the fourth lens may be concave. For example, an image-side surface of the fourth lens may be concave.

The fourth lens may have an aspherical surface. For example, both surfaces of the fourth lens may be aspherical. The fourth lens may be made of a material having a high light transmissivity and an excellent workability. For example, the fourth lens may be made of plastic. The fourth lens may have a high refractive index. For example, the refractive index of the fourth lens may be 1.6 or more.

The fifth lens may have a refractive power. For example, the fifth lens may have a positive refractive power. One surface of the fifth lens may be concave. For example, an object-side surface of the fifth lens may be concave.

The fifth lens may have an aspherical surface. For example, both surfaces of the fifth lens may be aspherical. The fifth lens may be made of a material having a high light transmissivity and an excellent workability. For example, the fifth lens may be made of plastic. The fifth lens may have a refractive index smaller than the refractive index of the fourth lens. For example, the refractive index of the fifth lens may be less than 1.6.

The sixth lens may have a refractive power. For example, the sixth lens may have a negative refractive power. One surface of the sixth lens may be concave. For example, an image-side surface of the sixth lens may be concave. The sixth lens may have an inflection point. For example, one or more inflection points may be formed on both surfaces of the sixth lens.

The sixth lens may have an aspherical surface. For example, both surfaces of the sixth lens may be aspherical. The sixth lens may be made of a material having a high light transmissivity and an excellent workability. For example, the sixth lens may be made of plastic. The sixth lens may have a refractive index that is substantially equal to the refractive index of the fourth lens. For example, the refractive index of the sixth lens may be 1.6 or more.

The aspherical surfaces of the first to sixth lenses are represented by Equation 1 below.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \tag{1}$$

In Equation 1, c is an inverse of a radius of curvature of the lens, k is a conic constant, r is a distance from a certain point on an aspherical surface of the lens to an optical axis of the lens, A to J are aspherical constants, and Z (or sag) is a distance between the certain point on the aspherical surface of the lens at the distance r and a tangential plane meeting the apex of the aspherical surface of the lens.

The optical imaging system may further include a filter, an image sensor, and a stop.

The filter may be disposed between the sixth lens and the image sensor. The filter may block some wavelengths of light. For example, the filter may block infrared wavelengths of light.

The image sensor may form the imaging plane. For example, a surface of the image sensor may form the imaging plane.

The stop may be disposed to control an amount of light incident to the image sensor. For example, the stop may be disposed between the first lens and the second lens, or between the second lens and the third lens, but is not limited to these positions.

The optical imaging system may satisfy one or more of Conditional Expressions 1 through 11 below.

$-35<\{(1/f)*(Y/\tan\theta)-1\}100<-5.0$ (Conditional Expression 1)

$TL/(2Y) \leq 1.01$ (Conditional Expression 2)

$0.3<R2/f<2.0$ (Conditional Expression 3)

$0.3<(R1+R2)/(R1-R2)<3.0$ (Conditional Expression 4)

$-1.5<f/f1<-0.05$ (Conditional Expression 5)

$0.1<|f/f3|<2.0$ (Conditional Expression 6)

$0.3<|f/f6|<1.8$ (Conditional Expression 7)

$1.2 \leq \tan\theta$ (Conditional Expression 8)

$1.8<f/EPD<2.4$ (Conditional Expression 9)

$0.4<(t1+t2)/t3<2.0$ (Conditional Expression 10)

$30 \leq V5-V6<40$ (Conditional Expression 11)

In the above conditional expressions, f is an overall focal length of the optical imaging system, 2Y is a diagonal length of the imaging plane, Y is half of 2Y, θ is half of a field of view of the optical imaging system, TL is a distance from an object-side surface of the first lens to the imaging plane, R1 is a radius of curvature of the object-side surface of the first lens, R2 is a radius of curvature of the image-side surface of the first lens, f1 is a focal length of the first lens, f2 is a focal length of the second lens, f3 is a focal length of the third lens, f6 is a focal length of the sixth lens, EPD is an entrance pupil diameter of the optical imaging system, t1 is a thickness of the first lens measured along the optical axis of the first lens, t2 is a thickness of the second lens measured along the optical axis of the second lens, t3 is a thickness of the third lens measured along the optical axis of the third lens, V5 is an Abbe number of the fifth lens, and V6 is an Abbe number of the sixth lens.

Next, several examples of an optical imaging system will be described.

FIG. 1 is a view illustrating a first example of an optical imaging system.

Referring to FIG. 1, an optical imaging system 100 includes a first lens 110, a second lens 120, a third lens 130, a fourth lens 140, a fifth lens 150, and a sixth lens 160.

The first lens 110 has a negative refractive power, and an object-side surface thereof is convex and an image-side surface thereof is concave. The second lens 120 has a positive refractive power, and an object-side surface thereof is convex and an image-side surface thereof is concave. The third lens 130 has a positive refractive power, and an object-side surface thereof is convex and an image-side surface thereof is convex. The fourth lens 140 has a negative refractive power, and an object-side surface thereof is convex and an image-side surface thereof is concave. The fifth lens 150 has a positive refractive power, and an object-side surface thereof is concave and an image-side surface thereof is convex. The sixth lens 160 has a negative refractive power, and an object-side surface thereof is convex and an image-side surface thereof is concave. In addition, an inflection point is formed on either one or both of the object-side surface and the image-side surface of the sixth lens 160.

The optical imaging system 100 further includes a filter 170, an image sensor 180, and a stop ST. The filter 170 is disposed between the sixth lens 160 and the image sensor 180, and the stop ST is disposed between the second lens 120 and the third lens 130, but is not limited to this position.

The optical imaging system 100 includes a plurality of lenses having a high refractive index. In this example, the second lens 120, the fourth lens 140, and the sixth lens 160 have a refractive index of 1.6 or more. In detail, the second lens 120, the fourth lens 140, and the sixth lens 160 have a refractive index greater than 1.62 and less than 2.0. The first lens 110, the third lens 130, and the fifth lens 150 have a refractive index less than 1.6.

The optical imaging system 100 has a wide field of view. In this example, half of a field of view of the optical imaging system 100 is 60.43°.

Figure 2:
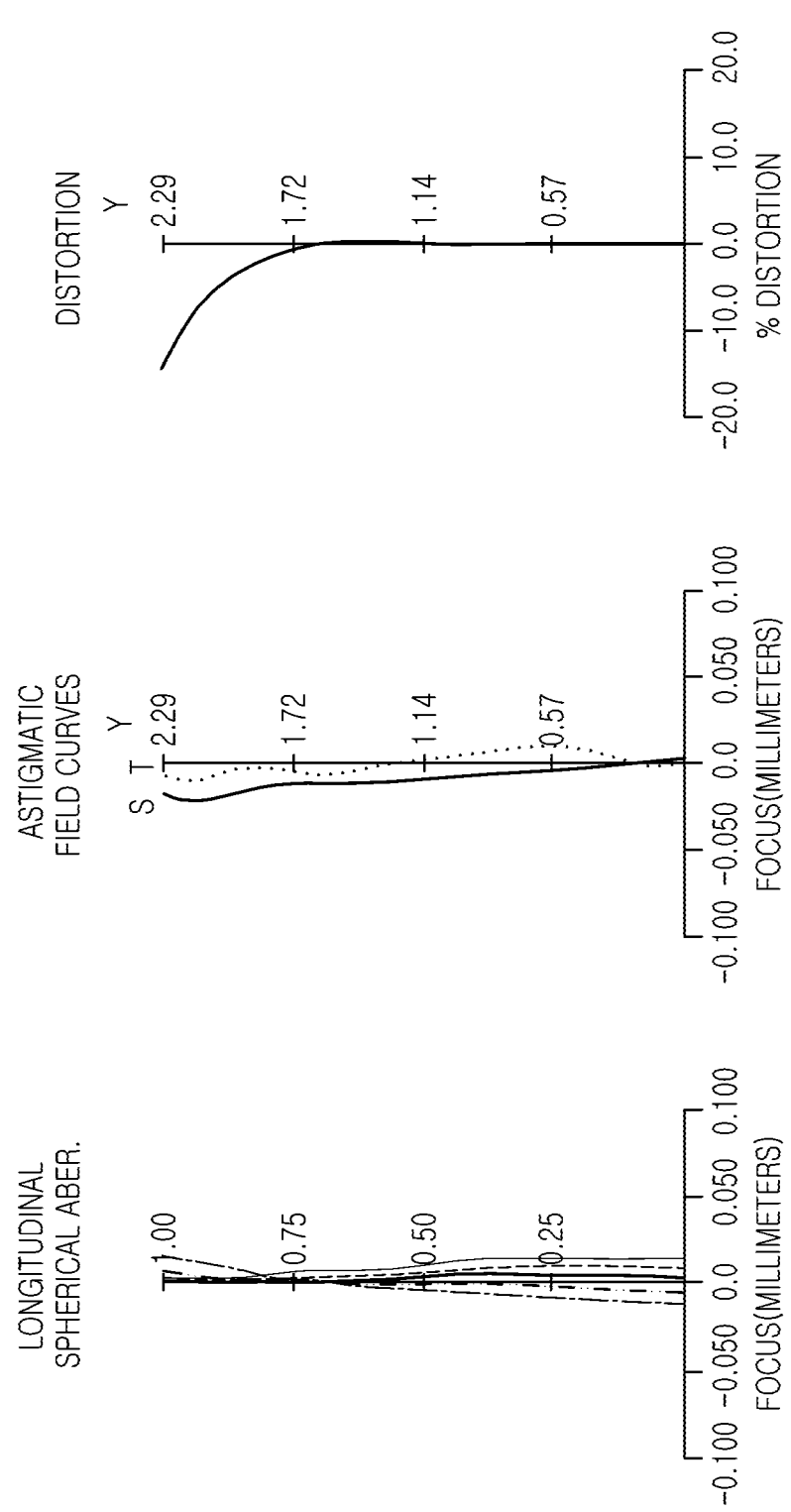
FIG. 2 illustrates curves representing aberration characteristics of the optical imaging system illustrated in FIG. 1.

FIG. 2 illustrates curves representing aberration characteristics of the optical imaging system illustrated in FIG. 1.

Table 1 below lists characteristics of the optical imaging system illustrated in FIG. 1, and Table 2 below lists aspherical values of the lenses of the optical imaging system illustrated in FIG. 1. In Table 1, F No. denotes an f-number of the optical imaging system.

TABLE 1

First Example
f = 1.52 F No. = 2.27 θ = 60.43° TL = 4.371

| Surface No. | | Radius of Curvature | Thickness/ Distance | Refractive Index | Abbe No. | Focal Length |
|---|---|---|---|---|---|---|
| S1 | First Lens | 5.7840 | 0.2770 | 1.544 | 56.11 | −2.507 |
| S2 | | 1.0890 | 0.4800 | | | |
| S3 | Second Lens | 1.4280 | 0.2880 | 1.661 | 20.35 | 9.593 |
| S4 | | 1.6890 | 0.1270 | | | |
| S5 | Third Lens | 2.4230 | 0.4890 | 1.544 | 56.11 | 1.958 |
| S6 | | −1.7790 | 0.1190 | | | |
| S7 | Fourth Lens | 4.9290 | 0.2400 | 1.661 | 20.35 | −6.398 |
| S8 | | 2.2460 | 0.1350 | | | |
| S9 | Fifth Lens | −10.0020 | 0.7600 | 1.544 | 56.11 | 1.238 |
| S10 | | −0.6510 | 0.0760 | | | |
| S11 | Sixth Lens | 1.5130 | 0.3400 | 1.639 | 23.52 | −1.840 |
| S12 | | 0.6070 | 0.3060 | | | |
| S13 | Filter | Infinity | 0.1100 | 1.517 | 64.20 | |
| S14 | | Infinity | 0.6240 | | | |
| S15 | Imaging Plane | Infinity | | | | |

TABLE 2

| | K | A | B | C | D | E | F | G |
|---|---|---|---|---|---|---|---|---|
| 1 | 0.000E+00 | 3.52228E−01 | −4.57367E−01 | 5.54815E−01 | −4.43051E−01 | 2.08686E−01 | −4.46770E−02 | |
| 2 | 0.000E+00 | 4.82462E−01 | −2.75320E−01 | −4.31932E−01 | 2.93776E+00 | −4.36257E+00 | 1.91316E+00 | |
| 3 | 0.000E+00 | −2.01547E−01 | −8.14268E−02 | −1.28672E+00 | 4.77938E+00 | −3.65505E+00 | 0.00000E+00 | |
| 4 | 0.000E+00 | −7.40746E−02 | −1.99421E−01 | 3.06977E−01 | 1.17718E+01 | −1.33441E+01 | 0.00000E+00 | |
| 5 | −4.823E+00 | −1.12792E−02 | 8.40112E−01 | −1.85087E+01 | 1.42801E+02 | −5.59146E+02 | 7.85652E+02 | |
| 6 | 6.408E+00 | −7.28042E−01 | 1.70290E+00 | −5.51765E+00 | −7.27612E+01 | 3.33137E+01 | −6.02001E+01 | |
| 7 | 0.000E+00 | −1.32354E+00 | 2.41577E+00 | −1.11894E+01 | 3.63980E+01 | −8.30887E+01 | 7.26161E+01 | |
| 8 | −3.094E+01 | −3.73681E−01 | 1.42649E−01 | 8.40185E−01 | −2.19014E+00 | 1.94169E+00 | −5.69101E−01 | |
| 9 | 9.900E+01 | 6.66785E−02 | −4.61831E−01 | 1.39346E+00 | −1.95226E+00 | 1.36069E+00 | −3.65587E−01 | |
| 10 | −7.458E−01 | 8.66660E−01 | −2.11698E+00 | 4.36311E+00 | −5.36845E+00 | 3.62156E+00 | −9.62811E−01 | |
| 11 | 0.000E+00 | −5.14975E−01 | 6.76306E−02 | 3.97418E−01 | −5.82852E−01 | 3.26641E−01 | −7.41583E−02 | 4.43995E−03 |
| 12 | −4.282E+00 | −2.80838E−01 | 2.31316E−01 | −1.34749E−01 | 4.35661E−02 | −6.66171E−03 | 8.48645E−05 | 6.50383E−05 |

Figure 3:
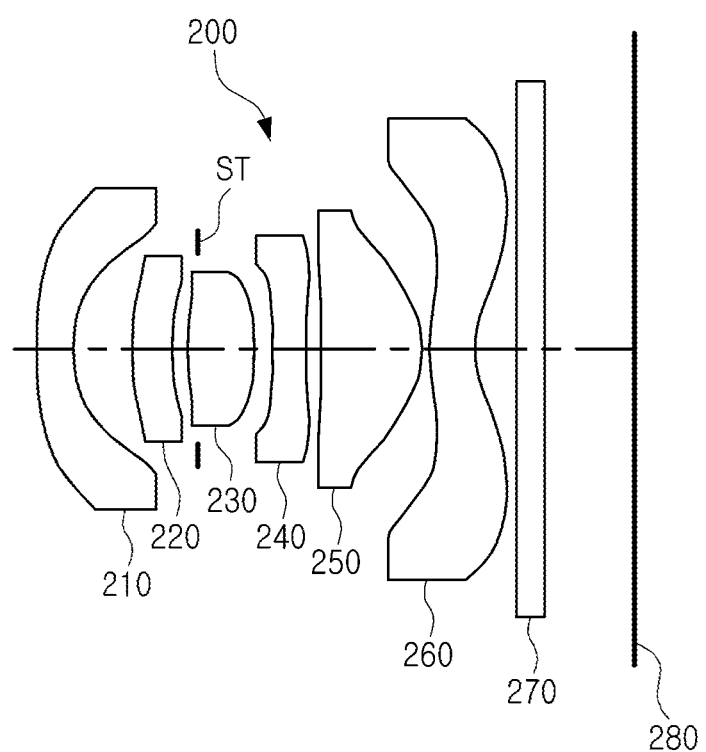
FIG. 3 is a view illustrating a second example of an optical imaging system.

FIG. 3 is a view illustrating a second example of an optical imaging system.

Referring to FIG. 3, an optical imaging system 200 includes a first lens 210, a second lens 220, a third lens 230, a fourth lens 240, a fifth lens 250, and a sixth lens 260.

The first lens 210 has a negative refractive power, and an object-side surface thereof is convex and an image-side surface thereof is concave. The second lens 220 has a positive refractive power, and an object-side surface thereof is convex and an image-side surface thereof is concave. The third lens 230 has a positive refractive power, and an object-side surface thereof is convex and an image-side surface thereof is convex. The fourth lens 240 has a negative refractive power, and an object-side surface thereof is convex and an image-side surface thereof is concave. The fifth lens 250 has a positive refractive power, and an object-side surface thereof is concave and an image-side surface thereof is convex. The sixth lens 260 has a negative refractive power, and an object-side surface thereof is convex and an image-side surface thereof is concave. In addition, an inflection point is formed on either one or both of the object-side surface and the image-side surface of the sixth lens 260.

The optical imaging system 200 further includes a filter 270, an image sensor 280, and a stop ST. The filter 270 is disposed between the sixth lens 260 and the image sensor 280, and the stop ST is disposed between the second lens 220 and the third lens 230, but is not limited to this position.

The optical imaging system 200 includes a plurality of lenses having a high refractive index. In this example, the second lens 220, the fourth lens 240, and the sixth lens 260 have a refractive index of 1.6 or more. In detail, the second lens 220, the fourth lens 240, and the sixth lens 260 have a refractive index greater than 1.62 and less than 2.0. The first lens 210, the third lens 230, and the fifth lens 250 have a refractive index less than 1.6.

The optical imaging system 200 has a wide field of view. In this example, half of a field of view of the optical imaging system 200 is 60.03°.

Figure 4:
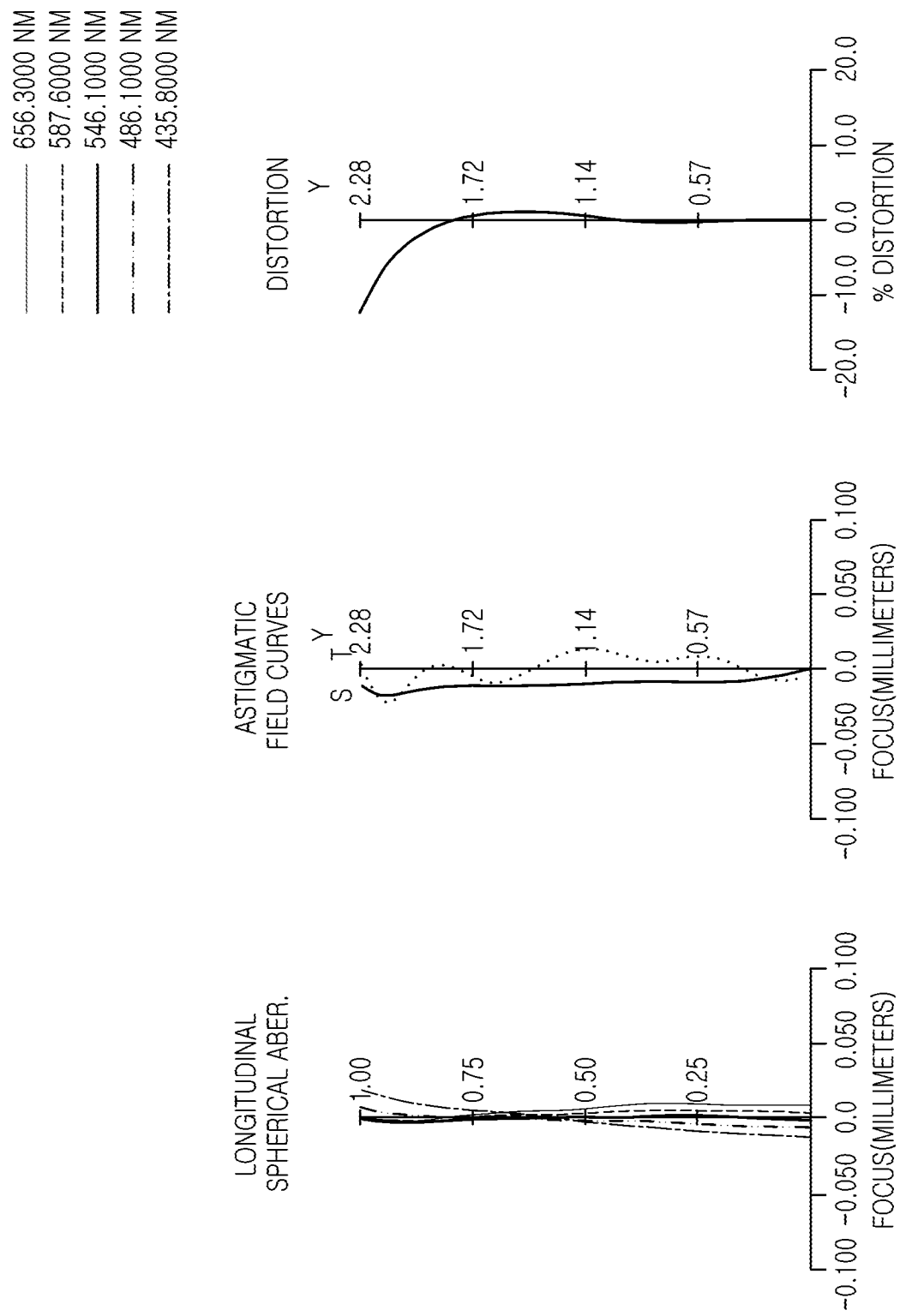
FIG. 4 illustrates curves representing aberration characteristics of the optical imaging system illustrated in FIG. 3.

FIG. 4 illustrates curves representing aberration characteristics of the optical imaging system illustrated in FIG. 3.

Table 3 below lists characteristics of the optical imaging system illustrated in FIG. 3, and Table 4 below lists aspherical values of the optical imaging system illustrated in FIG. 3.

TABLE 3

Second Example
f = 1.51 F No. = 2.27 θ = 60.03° TL = 4.299

| Surface No. | | Radius of Curvature | Thickness/ Distance | Refractive Index | Abbe No. | Focal Length |
|---|---|---|---|---|---|---|
| S1 | First Lens | 12.1810 | 0.2700 | 1.544 | 56.11 | −2.502 |
| S2 | | 1.2200 | 0.4240 | | | |
| S3 | Second Lens | 1.6800 | 0.2920 | 1.661 | 20.35 | 10.894 |
| S4 | | 2.0310 | 0.1110 | | | |
| S5 | Third Lens | 2.7790 | 0.4810 | 1.544 | 56.11 | 2.015 |
| S6 | | −1.7130 | 0.1200 | | | |
| S7 | Fourth Lens | 3.9630 | 0.2400 | 1.661 | 20.35 | −6.825 |
| S8 | | 2.0690 | 0.1140 | | | |
| S9 | Fifth Lens | −9.3310 | 0.7290 | 1.544 | 56.11 | 1.202 |
| S10 | | −0.6310 | 0.0500 | | | |
| S11 | Sixth Lens | 1.4030 | 0.3300 | 1.639 | 23.52 | −1.824 |
| S12 | | 0.5810 | 0.2900 | | | |
| S13 | Filter | Infinity | 0.2100 | 1.517 | 64.20 | |
| S14 | | Infinity | 0.6380 | | | |
| S15 | Imaging Plane | Infinity | | | | |

TABLE 4

| | K | A | B | C | D | E | F | G | H |
|---|---|---|---|---|---|---|---|---|---|
| 1 | 0.000E+00 | 5.43285E−01 | −8.28793E−01 | 1.14123E+00 | −1.03394E+00 | 5.38517E−01 | −1.22015E−01 | | |
| 2 | 0.000E+00 | 7.81536E−01 | −5.41143E−01 | −6.50944E−01 | 6.41187E+00 | −1.28913E+01 | 7.24283E+00 | | |
| 3 | 0.000E+00 | −1.67166E−01 | 2.99947E−02 | −2.64673E+00 | 8.22452E+00 | −6.75935E+00 | 0.00000E+00 | | |
| 4 | 0.000E+00 | 1.32446E−02 | −1.91617E−01 | −7.89442E−01 | 2.05226E+01 | −2.48112E+01 | 0.00000E+00 | | |
| 5 | 1.063E+00 | −3.16938E−02 | 1.11754E+00 | −2.86559E+01 | 2.53963E+02 | −1.10339E+03 | 1.78222E+03 | | |
| 6 | 5.220E+00 | −8.61126E−01 | 2.30682E+00 | −9.41817E+00 | 1.56350E+01 | −4.73270E+00 | −2.89819E+01 | | |
| 7 | 0.000E+00 | −1.46534E+00 | 2.79363E+00 | −1.03081E+01 | 3.07933E+01 | −7.00136E+01 | 6.58621E+01 | | |
| 8 | −2.256E+01 | −4.89323E−01 | 1.56364E−01 | 1.85054E+00 | −4.42716E+00 | 3.88461E+00 | −1.17156E+00 | | |
| 9 | 9.900E+01 | 1.70507E−01 | −1.46121E+00 | 4.73345E+00 | −7.00308E+00 | 5.09470E+00 | −1.43834E+00 | | |
| 10 | −7.326E−01 | 9.49560E−01 | −2.63708E+00 | 6.13829E+00 | −8.50387E+00 | 6.49825E+00 | −1.95317E+00 | | |
| 11 | 0.000E+00 | −7.37568E−01 | 3.26566E−01 | 3.19279E−01 | −7.68216E−01 | 5.06161E−01 | −1.18816E−01 | 3.84498E−03 | |
| 12 | −4.503E+00 | −3.64905E−01 | 3.74654E−01 | −2.67374E−01 | 1.15116E−01 | −2.89185E−02 | 3.79319E−03 | −1.96580E−04 | |

Figure 5:
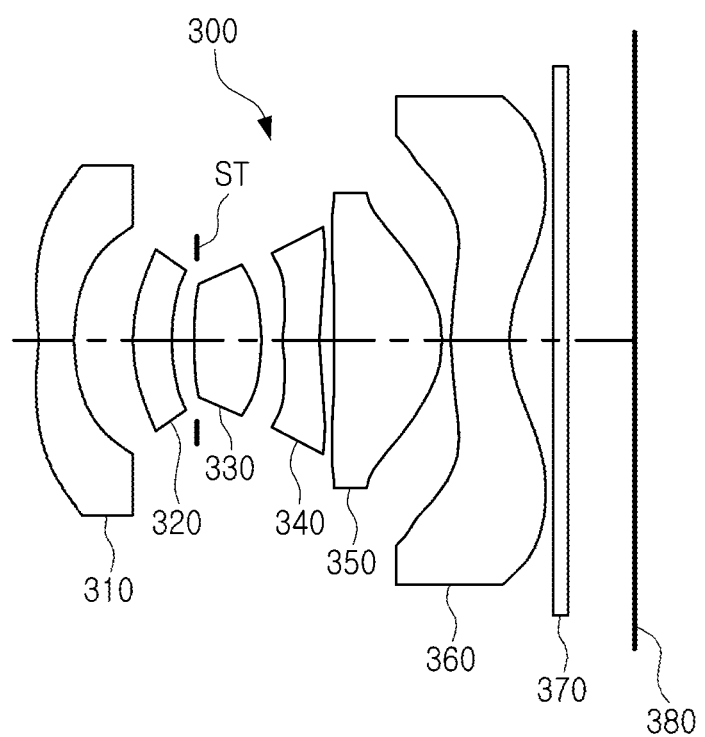
FIG. 5 is a view illustrating a third example of an optical imaging system.

FIG. 5 is a view illustrating a third example of an optical imaging system.

Referring to FIG. 5, an optical imaging system 300 includes a first lens 310, a second lens 320, a third lens 330, a fourth lens 340, a fifth lens 350, and a sixth lens 360.

The first lens 310 has a negative refractive power, and an object-side surface thereof is concave and an image-side surface thereof is concave. The second lens 320 has a positive refractive power, and an object-side surface thereof is convex and an image-side surface thereof is concave. The third lens 330 has a positive refractive power, and an object-side surface thereof is convex and an image-side surface thereof is convex. The fourth lens 340 has a negative refractive power, and an object-side surface thereof is convex and an image-side surface thereof is concave. The fifth lens 350 has a positive refractive power, and an object-side surface thereof is concave and an image-side surface thereof is convex. The sixth lens 360 has a negative refractive power, and an object-side surface thereof is convex and an image-side surface thereof is concave. In addition, an inflection point is formed on either one or both of the object-side surface and the image-side surface of the sixth lens 360.

The optical imaging system 300 further includes a filter 370, an image sensor 380, and a stop ST. The filter 370 is disposed between the sixth lens 360 and the image sensor 380, and the stop ST is disposed between the second lens 320 and the third lens 330, but is not limited to this position.

TABLE 5

Third Example
f = 1.56 F No. = 2.24 θ = 60.42° TL = 4.374

| Surface No. | | Radius of Curvature | Thickness/ Distance | Refractive Index | Abbe No. | Focal Length |
|---|---|---|---|---|---|---|
| S1 | First Lens | −26.6820 | 0.2770 | 1.544 | 56.11 | −2.777 |
| S2 | | 1.6150 | 0.4350 | | | |
| S3 | Second Lens | 1.2810 | 0.2800 | 1.661 | 20.35 | 10.327 |
| S4 | | 1.4350 | 0.1630 | | | |
| S5 | Third Lens | 2.4120 | 0.4950 | 1.544 | 56.11 | 1.793 |
| S6 | | −1.5310 | 0.1660 | | | |
| S7 | Fourth Lens | 11.4070 | 0.2610 | 1.661 | 20.35 | −4.798 |
| S8 | | 2.4810 | 0.1020 | | | |
| S9 | Fifth Lens | −10.1420 | 0.7900 | 1.544 | 56.11 | 1.252 |
| S10 | | −0.6580 | 0.0590 | | | |
| S11 | Sixth Lens | 1.8200 | 0.4260 | 1.639 | 23.52 | −1.687 |
| S12 | | 0.6190 | 0.3210 | | | |
| S13 | Filter | Infinity | 0.1100 | 1.517 | 64.20 | |
| S14 | | Infinity | 0.4890 | | | |
| S15 | Imaging Plane | Infinity | | | | |

TABLE 6

| | K | A | B | C | D | E | F | G |
|---|---|---|---|---|---|---|---|---|
| 1 | 0.000E+00 | 3.13478E−01 | −3.01613E−01 | 2.83915E−01 | −1.82117E−01 | 6.98015E−02 | −1.26722E−02 | |
| 2 | 0.000E+00 | 3.78699E−01 | −5.94951E−02 | −2.21360E−02 | 3.44698E−01 | −2.24540E−02 | −2.48612E−01 | |
| 3 | 0.000E+00 | −1.67141E−01 | 1.31118E−01 | −9.82811E−01 | 2.41220E+00 | −1.53882E+00 | 0.00000E+00 | |
| 4 | 0.000E+00 | −5.16722E−03 | 7.45692E−02 | 1.90457E+00 | −7.84376E+00 | 2.73879E+01 | 0.00000E+00 | |
| 5 | −3.631E+01 | −4.86048E−03 | 3.28893E−01 | −6.11308E+00 | 3.78288E+01 | −1.14178E+02 | 1.18489E+02 | |
| 6 | 3.826E+00 | −2.94701E−01 | 8.15260E−01 | −4.05180E+00 | 1.07136E+01 | −1.55294E+01 | 7.74111E+00 | |
| 7 | 0.000E+00 | −7.96991E−01 | 1.20696E+00 | −3.90947E+00 | 7.59195E+00 | −1.07881E+01 | 5.91625E+00 | |
| 8 | −2.899E+01 | −2.55058E−01 | 2.20961E−01 | 1.69739E−01 | −7.07158E−01 | 5.78980E−01 | −1.44867E−01 | |
| 9 | 9.900E+01 | 1.28419E−01 | −6.05444E−01 | 1.78292E+00 | −2.49090E+00 | 1.74990E+00 | −4.83609E−01 | |
| 10 | −7.392E+01 | 8.29392E−01 | −1.94199E+00 | 4.01154E+00 | −5.13010E+00 | 3.62857E+00 | −1.00064E+00 | |
| 11 | 0.000E+00 | −4.03896E−01 | 7.32711E−02 | 2.51389E−01 | −4.13592E−01 | 2.29599E−01 | −4.29139E−02 | 2.24207E−04 |
| 12 | −4.516E+00 | −2.32641E−01 | 2.00682E−01 | −1.32084E−01 | 5.23083E−02 | −1.22355E−02 | 1.52811E−03 | −7.66512E−05 |

The optical imaging system 300 includes a plurality of lenses having a high refractive index. In this example, the second lens 320, the fourth lens 340, and the sixth lens 360 have a refractive index of 1.6 or more. In detail, the second lens 320, the fourth lens 340, and the sixth lens 360 have a refractive index greater than 1.62 and less than 2.0. The first lens 310, the third lens 330, and the fifth lens 350 have a refractive index less than 1.6.

The optical imaging system 300 has a wide field of view. In this example, half of a field of view of the optical imaging system 300 is 60.42°.

Figure 6:
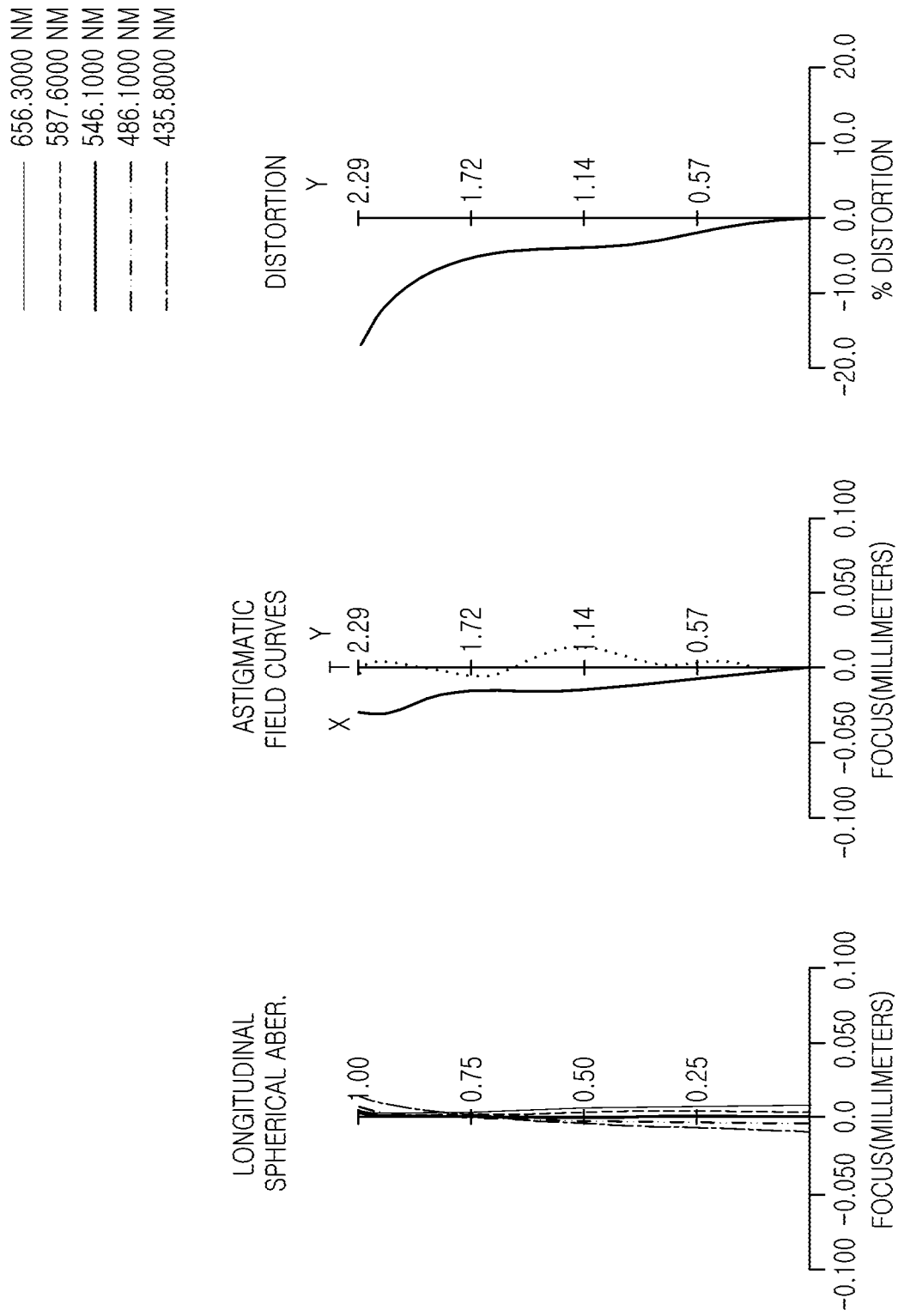
FIG. 6 illustrates curves representing aberration characteristics of the optical imaging system illustrated in FIG. 5.

FIG. 6 illustrates curves representing aberration characteristics of the optical imaging system illustrated in FIG. 5.

Table 5 below lists characteristics of the optical imaging system illustrated in FIG. 5, and Table 6 below lists aspherical values of the optical imaging system illustrated in FIG. 5.

Figure 7:
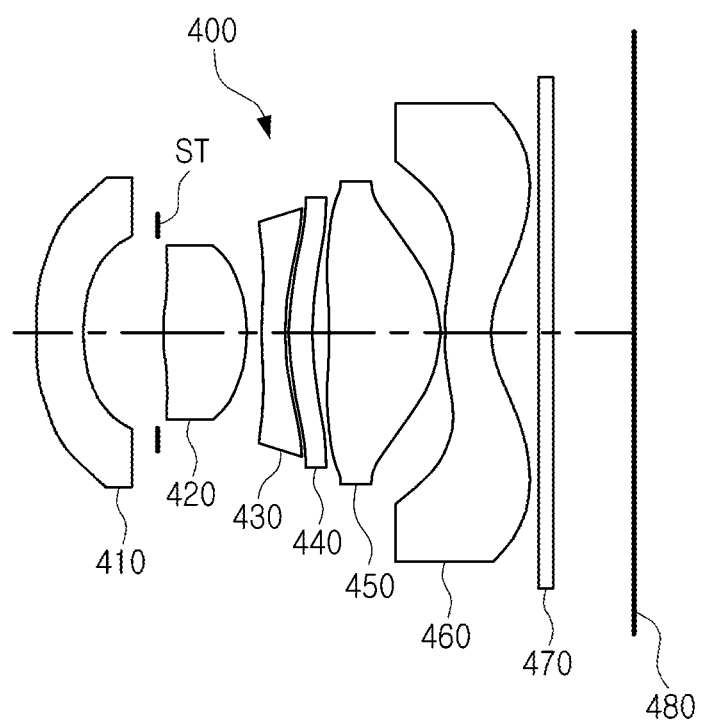
FIG. 7 is a view illustrating a fourth example of an optical imaging system.

FIG. 7 is a view illustrating a fourth example of an optical imaging system.

Referring to FIG. 7, an optical imaging system 400 includes a first lens 410, a second lens 420, a third lens 430, a fourth lens 440, a fifth lens 450, and a sixth lens 460.

The first lens 410 has a negative refractive power, and an object-side surface thereof is convex and an image-side surface thereof is concave. The second lens 420 has a positive refractive power, and an object-side surface thereof is convex and an image-side surface thereof is convex. The third lens 430 has a negative refractive power, and an object-side surface thereof is convex and an image-side surface thereof is concave. The fourth lens 440 has a positive refractive power, and an object-side surface thereof is convex and an image-side surface thereof is concave. The fifth lens 450 has a positive refractive power, and an object-side surface thereof is concave and an image-side surface thereof is convex. The sixth lens 460 has a negative refractive power, and an object-side surface thereof is convex and an image-side surface thereof is concave. In addition, an inflection point is formed on at least one of the object-side surface and the image-side surface of the sixth lens 460.

The optical imaging system 400 further includes a filter 470, an image sensor 480, and a stop ST. The filter 470 is disposed between the sixth lens 460 and the image sensor 480, and the stop ST is disposed between the first lens 410 and the second lens 420, but is not limited to this position.

The optical imaging system 400 includes a plurality of lenses having a high refractive index. In this example, the first lens 410, the third lens 430, the fourth lens 440, and the sixth lens 460 have a refractive index of 1.6 or more. In more detail, the first lens 410, the third lens 430, the fourth lens 440, and the sixth lens 460 have a refractive index greater than 1.65 and less than 2.0. The second lens 420 and the fifth lens 450 have a refractive index less than 1.6.

The optical imaging system 400 has a wide field of view. In this example, half of a field of view of the optical imaging system 400 is 63.26°.

Figure 8:
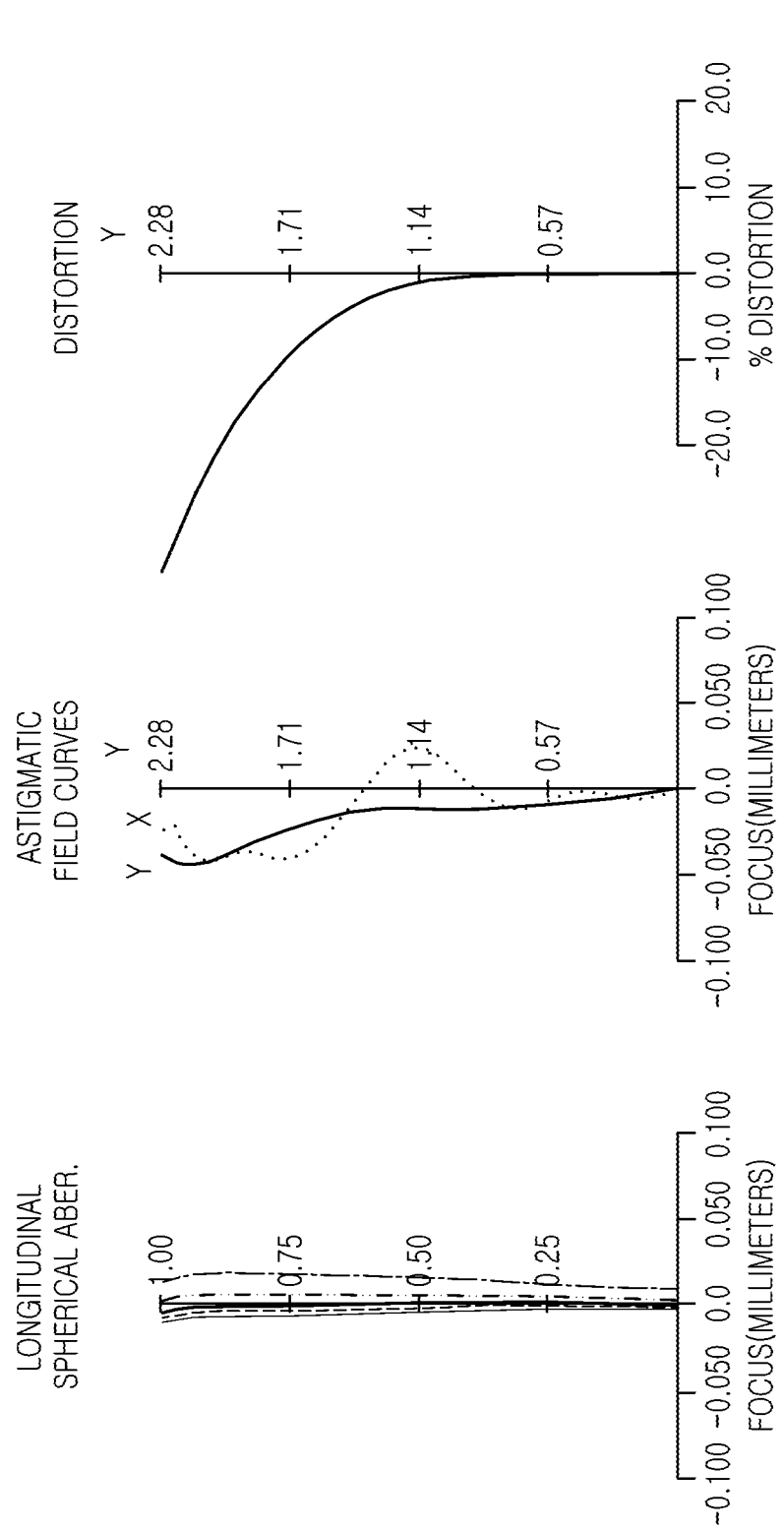
FIG. 8 illustrates curves representing aberration characteristics of the optical imaging system illustrated in FIG. 7.

FIG. 8 illustrates curves representing aberration characteristics of the optical imaging system illustrated in FIG. 7.

Table 7 below lists characteristics of the optical imaging system illustrated in FIG. 7, and Table 8 lists aspherical values of the optical imaging system illustrated in FIG. 7.

TABLE 7

Fourth Example
f = 1.75 F No. = 2.28 θ = 63.26° TL = 4.536

| Surface No. | | Radius of Curvature | Thickness/ Distance | Refractive Index | Abbe No. | Focal Length |
|---|---|---|---|---|---|---|
| S1 | First Lens | 2.6720 | 0.3570 | 1.667 | 20.35 | -4.243 |
| S2 | | 1.3010 | 0.6310 | | | |
| S3 | Second Lens | 11.1750 | 0.6090 | 1.546 | 56.11 | 2.292 |
| S4 | | -1.3820 | 0.1170 | | | |
| S5 | Third Lens | 2.9060 | 0.1800 | 1.667 | 20.35 | -6.805 |
| S6 | | 1.7280 | 0.0210 | | | |
| S7 | Fourth Lens | 1.6880 | 0.1800 | 1.667 | 20.35 | 15.048 |
| S8 | | 1.9430 | 0.1090 | | | |
| S9 | Fifth Lens | -16.6350 | 0.8580 | 1.546 | 56.11 | 1.341 |
| S10 | | -0.7140 | 0.0310 | | | |
| S11 | Sixth Lens | 1.3100 | 0.3520 | 1.667 | 20.35 | -1.724 |
| S12 | | 0.5460 | 0.3590 | | | |
| S13 | Filter | Infinity | 0.1100 | 1.518 | 64.20 | |
| S14 | | Infinity | 0.6220 | | | |
| S15 | Imaging Plane | Infinity | | | | |

TABLE 8

| | K | A | B | C | D | E | F | G |
|---|---|---|---|---|---|---|---|---|
| 1 | 0.000E+00 | 1.84991E-01 | -7.14219E-02 | 1.59948E-02 | 7.44179E-02 | -6.44078E-02 | 1.23278E-02 | |
| 2 | 0.000E+00 | 3.99600E-01 | -1.17734E-01 | 1.98169E+00 | -8.01555E+00 | 1.93366E+01 | -1.64648E+01 | |
| 3 | -9.680E+01 | -1.98390E-01 | -4.48524E-01 | -9.07313E-01 | 9.24328E+00 | -6.89974E+01 | 1.40373E+02 | |
| 4 | 1.919E+00 | -6.21149E-01 | 1.83481E+00 | -4.11768E+00 | 5.58827E+00 | 1.91445E+00 | -4.94146E+00 | |
| 5 | 0.000E+00 | -8.31476E-01 | 2.07619E+00 | -4.27107E+00 | 5.47547E+00 | -3.56871E+00 | 9.26189E-01 | |
| 6 | -1.563E+00 | -4.00129E-01 | 7.79868E-01 | -1.18467E+00 | 1.15699E+00 | -6.65897E-01 | 1.63749E-01 | |
| 7 | -1.550E+00 | -3.32871E-01 | 3.97841E-01 | -4.37877E-01 | 4.80330E-01 | -3.83702E-01 | 1.21861E-01 | |
| 8 | -1.562E+00 | -3.00262E-01 | 3.62156E-01 | -4.05155E-01 | 3.94444E-01 | -2.79985E-01 | 8.37939E-02 | |
| 9 | 9.900E+01 | 1.74445E-01 | -3.55849E-01 | 8.20030E-01 | -1.01542E+00 | 6.44041E-01 | -1.64629E-01 | |
| 10 | -7.694E-01 | 6.45178E-01 | -1.22654E+00 | 2.06539E+00 | -2.18676E+00 | 1.35461E+00 | -3.38201E-01 | |
| 11 | 0.000E+00 | -8.10587E-01 | 8.48686E-01 | -1.52516E+00 | 2.05820E+00 | -1.72099E+00 | 7.71724E-01 | -1.42939E-01 |
| 12 | -3.640E+00 | -2.89650E-01 | 2.13412E-01 | -1.14006E-01 | 3.75651E-02 | -7.38112E-03 | 7.66181E-04 | -3.19817E-05 |

Table 9 below lists the values of Conditional Expressions 1 through 11 for the first through the fourth examples of the optical imaging system illustrated in FIGS. 1, 3, 5, and 7.

TABLE 9

| Conditional Expression | First Example | Second Example | Third Example | Fourth Example |
|---|---|---|---|---|
| $\{(1/f) * (Y/\tan \theta) - 1\} * 100$ | -14.61 | -12.63 | -17.01 | -34.63 |
| TL/(2Y) | 0.96 | 0.94 | 0.96 | 0.99 |
| R2/f | 0.72 | 0.81 | 1.04 | 0.74 |
| (R1 + R2)/(R1 - R2) | 1.46 | 1.22 | 0.89 | 2.90 |
| f/f1 | -0.61 | -0.60 | -0.56 | -0.41 |
| |f/f3| | 0.78 | 0.75 | 0.87 | 0.26 |
| |f/f6| | 0.83 | 0.83 | 0.92 | 1.02 |
| tan θ | 1.762 | 1.734 | 1.762 | 1.985 |
| f/EPD | 2.27 | 2.27 | 2.24 | 2.28 |
| (t1 + t2)/t3 | 1.16 | 1.17 | 1.13 | 5.37 |
| V5 - V6 | 32.59 | 32.59 | 32.59 | 35.76 |

Figure 9:
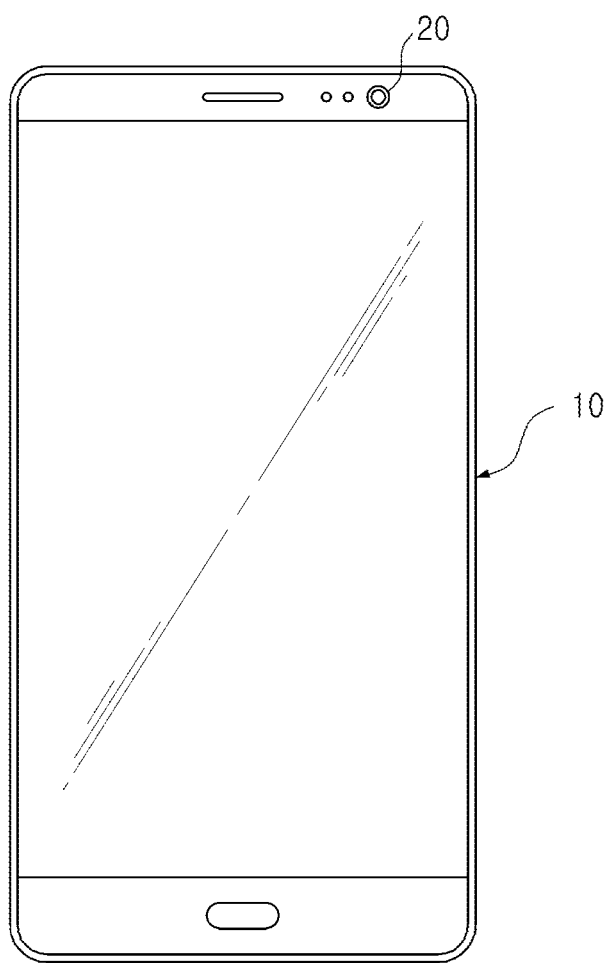
FIG. 9 is a front view illustrating an example of a wireless terminal in which an optical imaging system described in this application is mounted.
Figure 10:
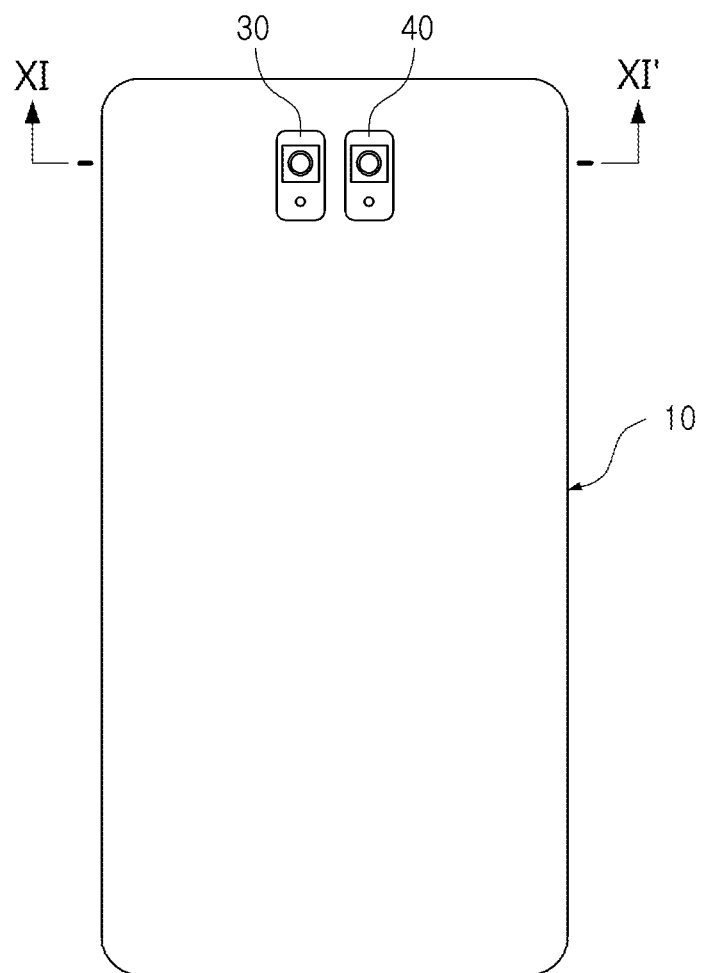
FIG. 10 is a rear view of the wireless terminal illustrated in FIG. 9.
Figure 11:
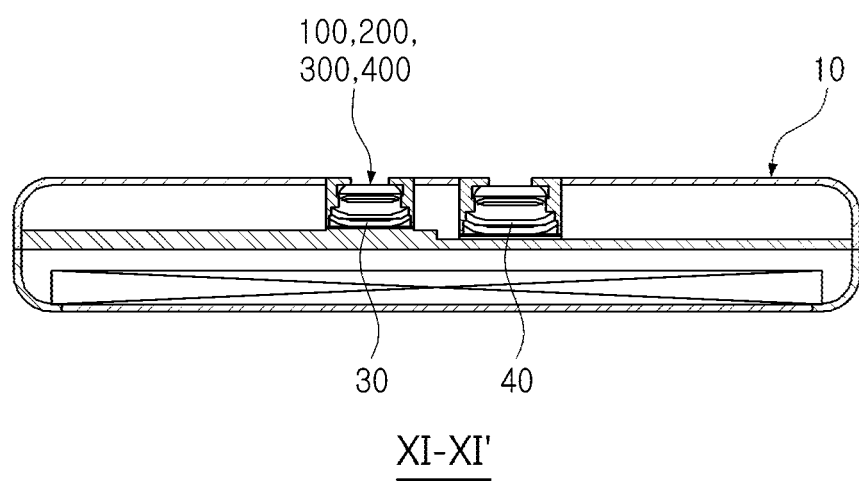
FIG. 11 is a cross-sectional view taken along the line XI-XI' in FIG. 10.

FIG. 9 is a front view illustrating an example of a wireless terminal in which an optical imaging system described in this application is mounted. FIG. 10 is a rear view of the wireless terminal illustrated in FIG. 9. FIG. 11 is a cross-sectional view taken along the line XI-XI' in FIG. 10.

Referring to FIGS. 9 through 11, a wireless terminal 10 includes a plurality of camera modules 20, 30 and 40. In this example, a first camera module 20 is disposed facing a front surface of the wireless terminal 10, and a second camera module 30 and a third camera module 40 are disposed facing a rear surface of the wireless terminal 10.

The first camera module 20 and the second camera module 30 are configured to capture an image of a subject positioned at a short distance away from the wireless terminal 10. In one example, half of a field of view of each of the first camera module 20 and the second camera module 30 is 60° or more, but is not limited thereto. The third camera module 40 is configured to capture an image of a subject positioned at a long distance away from the wireless terminal 10. In one example, half of a field of view of the third camera module 40 is 30° or less, but is not limited thereto. Each of the first camera module 20 and the second camera module 30 includes any one of the optical imaging systems 100, 200, 300, and 400 described above.

The examples described above provide an optical imaging system capable of being mounted in a thin wireless terminal and having a wide field of view.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having negative refractive power;
   a second lens having positive refractive power;
   a third lens having a refractive power;
   a fourth lens having a refractive power;
   a fifth lens having a refractive power; and
   a sixth lens having a refractive power and an image-side surface having an inflection point;
   wherein the first to sixth lenses are sequentially disposed in numerical order from an object side of the optical imaging system toward an imaging plane of the optical imaging system,
   wherein a radius of curvature of an object-side surface of the second lens is less than a radius of curvature of an image-side surface of the second lens and an absolute value of a radius of curvature of an object-side surface of the fifth lens, and
   wherein $TL/(2Y) \leq 1.01$,
   where TL is a distance from an object-side surface of the first lens to the imaging plane and 2Y is a diagonal length of the imaging plane.

2. The optical imaging system of claim 1, wherein the third lens has a convex object-side surface.

3. The optical imaging system of claim 1, wherein the third lens has a convex image-side surface.

4. The optical imaging system of claim 1, wherein the fourth lens has a convex object-side surface.

5. The optical imaging system of claim 1, wherein the fourth lens has a concave image-side surface.

6. The optical imaging system of claim 1, wherein the fifth lens has a concave object-side surface.

7. The optical imaging system of claim 1, wherein the fifth lens has a convex image-side surface.

8. The optical imaging system of claim 1, wherein the sixth lens has a convex object-side surface.

9. The optical imaging system of claim 1, wherein the sixth lens has a concave image-side surface.

10. The optical imaging system of claim 1, wherein $1.2 \leq \tan \theta$, where $\theta$ is half of a field of view of the optical imaging system.

11. The optical imaging system of claim 1, wherein $1.8 < f/EPD < 2.4$, where f is an overall focal length of the optical imaging system and EPD is an entrance pupil diameter of the optical imaging system.

12. The optical imaging system of claim 1, wherein $-1.5 < f/f1 < -0.05$, where f is an overall focal length of the optical imaging system and f1 is a focal length of the first lens.

13. The optical imaging system of claim 1, wherein $0.1 < |f/f3| < 2.0$, where f is an overall focal length of the optical imaging system and f3 is a focal length of the third lens.

14. The optical imaging system of claim 1, wherein $0.3 < |f/f6| < 1.8$, where f is an overall focal length of the optical imaging system and f6 is a focal length of the sixth lens.

15. The optical imaging system of claim 1, wherein $0.4 < (t1+t2)/t3 < 2.0$, where t1 is a thickness of the first lens measured along the optical axis of the first lens, t2 is a thickness of the second lens measured along an optical axis of the second lens, and t3 is a thickness of the third lens measured along an optical axis of the third lens.

* * * * *